UNITED STATES PATENT OFFICE 2,266,142

AZO DYES

Frederic Henry Adams, Somerville, N. J., assignor to American Cyanamid Company, New York, N. Y., a corporation of Maine No Drawing. Application July 10, 1940, Serial No. 344,669

14 Claims. (Cl. 260—205)

This invention relates to new azo dyestuffs and to materials dyed therewith.

The dyestuffs of the present invention are obtained by coupling any diazotized amine with an aryl amine containing at least one polyalkoxyalkyl group attached to the nitrogen of the amine. The general formula of these dyestuffs is as follows:

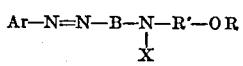

where Ar is an aryl radical which may be unsubstituted or may contain substituents such as sulfonic groups, the nitro group, halogen groups, carboxylic groups and the like, B is an arylene radical which may be unsubstituted or which may contain alkyl and/or halogen substituents, X is hydrogen, alkyl, aralkyl, hydroxyalkyl, alkoxyalkyl or polyalkoxyalkyl, R is alkyl and R' is a polyalkylene glycol radical.

The present invention is not limited to azo dyes containing any particular N-polyalkoxyalkyl amines and any of these amines may be used. Typical examples which give useful dyes are the following:

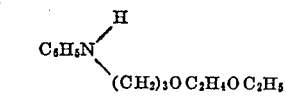
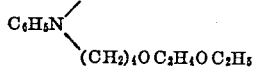
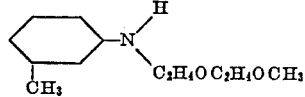
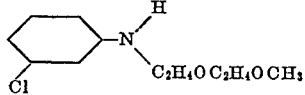
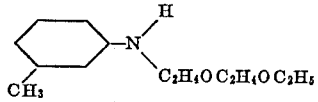
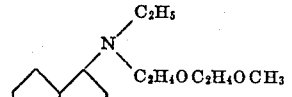
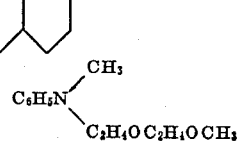

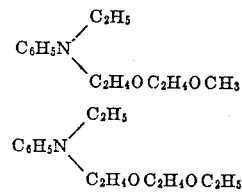
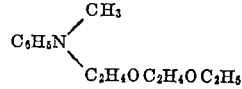
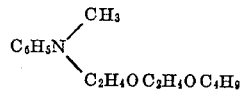
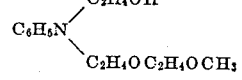
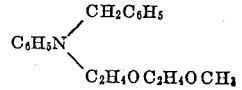
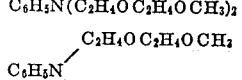
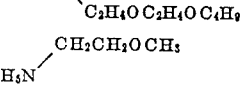
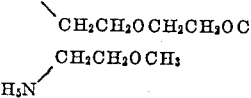
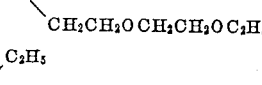
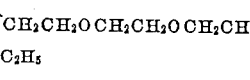
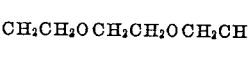
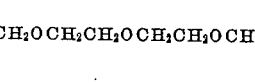
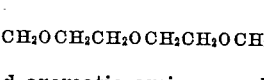
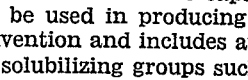

Any diazotized aromatic amine capable of azoic coupling may be used in producing azo dyes of the present invention and includes amines which are free from solubilizing groups such as aniline, beta naphthylamine and the like, and amines containing solubilizing groups such as sulfanilic acid, anthranilic acid, etc. Without intending to limit the invention to any particular amines, I have found that dyes of special commercial value are obtained from one of the following amines; paranitraniline, ortho chlor paranitraniline, 2-methyl-4-nitro aniline, 2-methyl-5-nitro aniline, 2-methoxy-4-nitro aniline, para amino acetanilide, 6-bromo-2,4-dinitro aniline, 6-chloro-2,4-dinitro aniline, 2,6-dichloro-4-nitro aniline.

The dyes in which the diazo component and the coupling component are free from solubilizing groups such as carboxy or sulfonic acid groups will generally be insoluble in water but more or less soluble in common organic solvents such as acetone, ether, alcohol, benzene, and the like. They are, however, readily dispersed in water with the use of colloidizing or dispersing agents and when so dispersed will dye synthetic fibers such as cellulose esters in shades of yellow, orange, scarlet, red, bordeaux, violet and blue. A particularly important field of the organic soluble dyes of the present invention lies in the fact that contrary to most of the ordinary azo dyes they are capable of dyeing synthetic fibers of vinylhalide-vinylacetate copolymers and many of them exhibit remarkable good fastness to light when dyed on these fibers.

This characteristic of the oil-soluble dyes of the present invention is one of the great practical advantages because the dyeing of synthetic fibers of the vinylhalide-vinylacetate copolymer type has presented a very serious problem even more serious than was originally presented when fabrics of cellulose acetate first assumed commercial importance. While many oil-soluble azo dyes have proved to be suitable in the dispersed form for dyeing cellulose acetate, up to the present time, most of them have not been satisfactory for dyeing vinylhalide-vinylacetate copolymers. I do not wish to limit this feature of the present invention to any theory of action but I believe that the affinity for the vinylhalide-vinylacetate copolymers is to a considerable extent due to the polyalkoxyalkyl amine portion of the molecule.

The oil soluble dyes of the present invention are not limited in their use to the dyeing of synthetic fibers of the cellulose ester and vinylhalide-vinylacetate copolymer type although this is their most important commercial field at the present time. On the contrary, they may be used generally where oil soluble azo dyes have been employed, such as for example in the coloring of various coating compositions employing organic solvents, the coloring of citrus fruit to enhance the variety of color, and the like. The dyestuffs of the present invention will contain one or more solubilizing groups such as carboxyl or sulfonic acid groups are soluble in water to a greater or less degree, usually in the form of their alkali metal salts, and can be used to dye wool, silk, or similar fibers of animal origin.

The aryl radical shown in the formula may contain an amino group which is diazotizable and in such a case the coloring matter obtained may be diazotized either in solution or on the fiber and coupled with suitable coupling components to form disazo dyes. The aryl radical in the formula therefore may be considered as including aryl-azo-aryl radicals.

The present invention will be illustrated in greater detail in the following specific examples which represent typical coloring matters obtainable in accordance with the present invention, which however is not limited to the details set forth. The parts are by weight.

*Example 1*

6.9 parts of paranitraniline are dissolved in a hot mixture of 54.3 parts of 5-N-hydrochloric acid and 50 parts of water, and the resulting solution is quickly iced to 10° C. A solution of 3.5 parts of sodium nitrite in 10 parts of water is quickly added to this mixture and the whole is stirred until diazotization is complete. The diazo solution is clarified by filtration with diatomaceous earth and poured with stirring into a solution of 11.5 parts of N-beta-methoxy-ethoxy-ethyl-N-ethyl aniline in 32.5 parts of 5N hydrochloric acid and 200 parts of water. The coupling is completed by the gradual addition of 204 parts of 2N sodium acetate solution. The red dye formed is filtered by suction, washed with water and dried at low temperature. The formula of the dye is

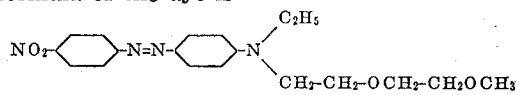

The dye crystallized from alcohol melts at 66° C. It dyes cellulose acetate and vinyl halide-vinyl acetate copolymer fibers bright scarlet shades of good fastness.

*Example 2*

4.15 parts of paranitraniline is diazotized as in Example 1 and the filtered diazo solution is poured with stirring into a solution of 6.8 parts of N-beta-ethoxy-ethoxy-ethyl-N-methylaniline in 21.7 parts of 5N hydrochloric acid and 100 parts of water. The coupling is brought to completion by the addition of 159 parts of 20% sodium acetate solution. The red dye which separates is filtered off, washed with water and dried. A dye of the following formula is obtained:

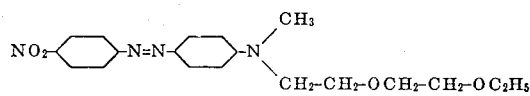

The dye crystallized from alcohol melts at 85°–85.5° C. It colors cellulose acetate and vinyl halide-vinyl acetate copolymer fibers bright scarlet shades.

*Example 3*

6.9 parts of paranitraniline are diazotized according to the method given in Example 1. The filtered diazo solution is added with stirring to a solution of 15.2 parts of N,N-bis(beta-methoxy-ethoxy-ethyl)aniline in 21.7 parts of 5N hydrochloric acid and 100 parts of water. The coupling is completed by the gradual addition of 212 parts of 20% sodium acetate solution. The red product which separates is filtered, washed and dried in the usual manner. The dye crystalizes from mixed hexanes in fine red needles of melting point 60.5°–61° C. The formula of the dye is

The product dyes vinyl halide-vinyl acetate copolymer fibers strong scarlet shades of excellent fastness properties and also dyes cellulose acetate a similar color.

*Example 4*

8.63 parts of ortho-chloro-paranitraniline is intimately mixed with 25 parts of water and 52.3 parts of N-sodium nitrite solution and the resulting slurry is added rapidly with stirring to a mixture of 54.2 parts of 5N hydrochloric acid and sufficient ice to lower the temperature of the acid below 0° C. After one-half hour's stirring the diazo solution is clarified by filtration with diatomaceous earth and added with stirring to a solution of 13 parts of N-beta-ethoxy-ethoxy-ethyl N-ethyl aniline in 21.7 parts of 5N hydrochloric acid and 100 parts of water. The coupling is brought to completion by the gradual addition of 159 parts of 20% sodium acetate solution. The product separates as a sticky gum which gradually solidifies on standing. The dye of the formula

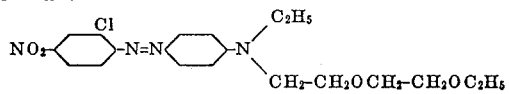

dyes vinyl halide-vinyl acetate copolymer fibers and cellulose acetate in bright bluish red shades of excellent fastness to light.

Example 5

7.25 parts of 6-bromo-2,4-dinitro aniline is gradually added at 50°–60° with stirring to nitrosyl sulfuric acid made by slowly adding 1.75 parts of sodium nitrite to 30 parts of sulfuric acid, specific gravity 1.84. The mixture is stirred a few minutes at 50° and then for one-half hour at 20°–30° C. It is then poured onto 37.5 parts of ice and the resulting solution is filtered and immediately added to a solution of 3.5 parts of N-beta-methoxy-ethoxy-ethyl N-ethyl-alpha-naphthyl-amine dissolved in 57.6 parts of 5N sulfuric acid. Coupling is complete at once without addition of sodium acetate. The dye is filtered, slurried in water, filtered again and washed with water until free from acid and dried at 60° C. The product of the following formula:

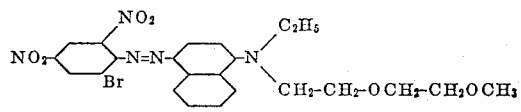

dyes vinyl halide-vinyl acetate copolymer fibers and cellulose acetate light blue shades.

Example 6

7.5 parts of para amino acetanilide is dissolved in 24 parts of 5N hydrochloric acid and 150 parts of water. The solution is iced to approximately 5° C. and the base is diazotized by the addition with stirring of 52.3 parts of normal sodium nitrite solution.

This diazo solution is added with stirring to a solution of 11.5 parts of N-beta-methoxy-ethoxy-ethyl-N-ethyl aniline in 100 parts of water and 32.3 parts of 5N hydrochloric acid. To this mixture is gradually added 214 parts of 2N sodium acetate solution and stirring is continued for several hours. The yellow product is filtered off, washed, dried and crystallized from a mixture of toluene and hexane. The dyestuff has the following formula

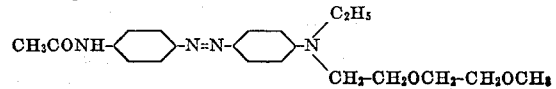

It dyes vinyl halide-vinyl acetate copolymer fibers and cellulose acetate in fast yellow shades.

Example 7

3.9 parts of the dye described in Example 6 is boiled for a few minutes in 109 parts of 5N hydrochloric acid. The deep red solution is diluted with 1,000 parts of water, iced to about 10° C. and the dye is diazotized by the gradual addition of 11.5 parts of normal sodium nitrite solution. After a few minutes' stirring, the mineral acid is neutralized by the addition of 530 parts of 20% sodium acetate solution. Forty parts of cotton cloth impregnated with the anilide of beta-hydroxy naphthoic acid is entered into the diazo solution. A black dye of the following formula:

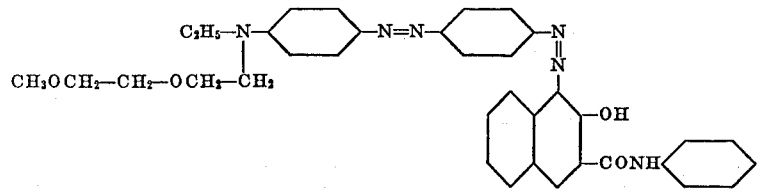

is formed on the fiber.

Example 8

8.7 parts of sulfanilic acid is dissolved in 11.86 parts of 5N caustic soda solution and 50 parts of water. To this is added 52.25 parts of normal sodium nitrite solution and the whole is slowly poured with stirring into a mixture of 76 parts of 5N hydrochloric acid and ice. After stirring a few minutes, diazotization is complete and the resulting diazo solution is poured into a solution of 11.5 parts of N-beta-methoxy-ethoxy-ethyl N-ethyl aniline in 16.3 parts of 5N hydrochloric acid and 50 parts of water. Coupling is quickly brought to completion by the addition of 214 parts of 2N sodium acetate solution. To the deep orange solution thus obtained is added 170 parts of common salt and 59.3 parts of 5N caustic soda solution. The resulting granular orange precipitate is filtered at 50°, dried at 100° C. and ground. The dye has the following formula:

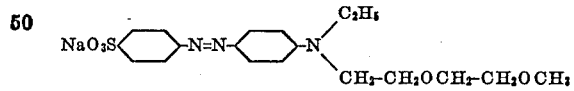

It is readily soluble in water and slightly soluble in hot alcohol. It dyes wool a bright orange from an acid bath.

Example 9

2.8 parts of sodium nitrite are added very slowly in small portions with stirring to 52 grams of concentrated sulfuric acid, specific gravity 1.84. To the nitrosyl sulfuric acid solution thus obtained is slowly added at about 30° C., 8.3 parts of 2,6-dichloro 4-nitro aniline. The mixture is stirred for about ¾ hour at 25°–30° C. and then poured onto 240 parts of ice. One part of sulfamic acid is added and after a short period of stirring the solution is filtered with diatomaceous earth. The filtered diazo is rapidly added with stirring to a solution of 9 parts of N-beta-methoxy-ethoxy-ethyl-N-ethyl aniline dissolved in 11.5 parts of 5N sulfuric acid and 200 parts of water. Coupling is soon complete and the dye is precipitated as a gummy mass. The water is then decanted and the dye is washed with water several times by decantation. The resulting dye when properly dispersed dyes copolymerized vinyl acetate and vinyl chloride and cellulose acetate in exceptionally fast reddish brown shades. The dye has the following formula:

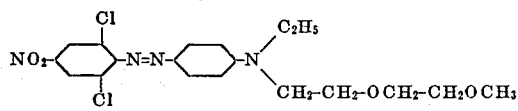

*Example 10*

6.9 parts of p-nitraniline are diazotized according to the method given in Example 1. This diazo solution is poured with stirring into a solution of 13 parts of N-beta-methoxyethyl-N-beta-methoxyethoxyethyl aniline in 22 parts of 5N hydrochloric acid and 100 parts of water. The acidity to Congo red paper is then destroyed by the gradual addition of 214 parts of 2N sodium acetate solution. Coupling is soon complete, and the dye separates out as an oil which soon crystallizes. The dye is then filtered, washed, and dried at low temperature.

The formula of the dye is as follows:

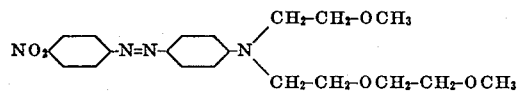

It dyes copolymerized vinyl halide-vinyl acetate fibers and cellulose esters, such as cellulose acetate, in bright scarlet shades of good fastness properties.

*Example 11*

2.76 parts of para nitraniline are diazotized according to the method given in Example 1. The resulting diazo solution is poured with stirring into a solution of 5.5 parts of N-beta-methoxy-ethoxy-ethoxy-ethyl N-ethyl aniline in 11 parts of 5N hydrochloric acid and 100 parts of water. To the mixture is gradually added with stirring, 82 parts of 2N sodium acetate solution to destroy acidity to Congo red paper. The dye separates as a dark red granular precipitate and is filtered off at low temperature and washed with cold water. The dye is extremely soluble in such organic solvents as benzene, acetone, ether, cellosolve, alcohol, etc., and sparingly in hexane. Crystallized from hexane it melts at 32°–33° C. When properly dispersed it dyes cellulose esters such as cellulose acetate and copolymerized vinyl halide-vinyl acetate in bright scarlet shades of good fastness properties. The dye has the following formula:

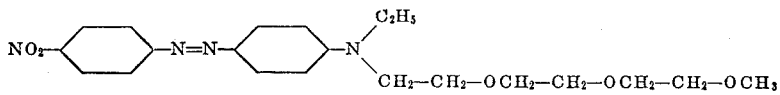

*Example 12*

6.9 parts of para nitraniline are diazotized according to the method given in Example 1. The diazo is added with stirring to a solution of 16 parts of N-beta-methoxy-ethoxy-ethoxy-ethoxy-ethyl N-ethyl aniline in 22 parts of 5N hydrochloric acid and 200 parts of water. The coupling is completed by the gradual addition of 204 parts of 2N sodium acetate solution. The dye separates as a red solid which is filtered, washed, and dried in the usual manner. The product is a low-melting red solid practically insoluble in water but extremely soluble in the usual organic solvents. From an aqueous dispersion it dyes cellulose esters such as cellulose acetate and copolymerized vinyl halide-vinyl acetate in bright scarlet shades of good fastness. The formula for the dye is as follows:

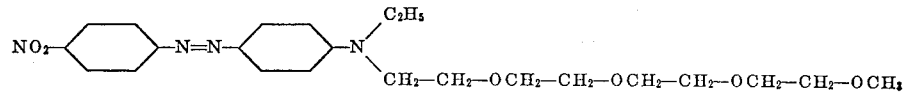

A number of other water-insoluble azo dyestuffs containing the N-beta-alkoxy-ethoxy-ethyl group are given in the following table:

*Table of dyes*

| Diazo component | Coupling component | Shade on vinyl-halide-vinyl acetate copolymers and/or cellulose acetate |
|---|---|---|
| p-Nitraniline | N-beta-methoxy-ethoxy-ethyl aniline | Orange. |
| o-Chlor-p-nitraniline | do | Reddish orange. |
| p-Nitraniline | N-beta-methoxy-ethoxy-ethyl m-chloraniline | Orange. |
| Do | N-beta-methoxy-ethoxy-ethyl m-toluidine | Scarlet. |
| Do | N-beta-methoxy-ethoxy-ethyl cresidine | Red. |
| Do | N-beta-n-butoxy-ethoxy-ethyl aniline | Yellowish orange. |
| 2-methyl-4-nitraniline | do | Reddish orange. |
| p-Nitraniline | N-beta-methoxy-ethoxy-ethyl N-methyl aniline | Scarlet. |
| 2-methoxy-4-nitraniline | do | Red. |
| 2-methyl-5-nitraniline | do | Golden yellow. |
| o-Chlor-p-nitraniline | do | Bluish red. |
| Do | N-beta-methoxy-ethoxy-ethyl N-ethyl aniline | Do. |
| 2-methyl-4-nitraniline | do | Scarlet red. |
| 2-methoxy-4-nitraniline | N-beta-methoxy-ethoxy-ethyl N-ethyl aniline | Red. |
| 2, 5-dichlor aniline | N-beta-methoxy-ethoxy-ethyl N-ethyl aniline | Yellow. |
| m-Nitraniline | do | Do. |
| 2-methyl-5-nitraniline | do | Golden yellow. |
| o-Chlor-p-nitraniline | N-beta-ethoxy-ethoxy-ethyl N-methyl aniline | Bluish red. |
| p-Nitraniline | N-beta-ethoxy-ethoxy-ethyl N-ethyl aniline | Scarlet. |
| 2-methyl-4-nitraniline | do | Yellowish red. |
| 2-methoxy-4-nitraniline | do | Medium red. |
| p-Nitraniline | N-beta-ethoxy-ethoxy-ethyl N-ethyl m-toluidine | Do. |
| Do | N-beta-n-butoxy-ethoxy-ethyl N-methyl aniline | Scarlet. |
| Do | N-beta-methoxy-ethoxy-ethyl N-benzyl aniline | Reddish orange. |
| Do | N-beta-methoxy-ethoxy-ethyl N-beta-hydroxyethyl aniline | Scarlet. |
| o-Chlor-p-nitraniline | N, N-bis (beta-methoxy-ethoxy-ethyl)-aniline | Bluish red. |

What I claim is:

1. Azo dyes of the formula:

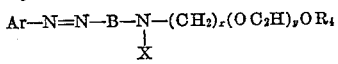

in which Ar is an aromatic radical of the group consisting of the benzene and naphthalene series, B is a member of the group consisting of aryl hydrocarbon radicals of the benzene and naphthalene series and halogen containing aryl radicals of the benzene and naphthalene series, R is alkyl, $y$ and $x$ are small whole numbers, and X is a member of the group consisting of hydrogen, alkyl, aralkyl, hydroxyalkyl, alkoxyalkyl and polyalkoxyalkyl radicals.

2. Azo dyes of the formula:

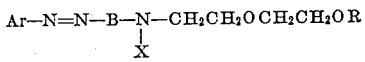

in which Ar is an aromatic radical of the group consisting of the benzene and naphthalene series, B is a member of the group consisting of aryl hydrocarbon radicals of the benzene and naphthalene series and halogen containing aryl radicals of the benzene and naphthalene series, and X is a member of the group consisting of hydrogen, alkyl, aralkyl, hydroxyalkyl, alkoxyalkyl and polyalkoxyalkyl radicals.

3. Azo dyes according to claim 1 in which the dye is free from sulfonic and carboxylic acid groups.

4. Azo dyes according to claim 2 in which the dye is free from sulfonic and carboxylic acid groups.

5. Azo dyes of the formula:

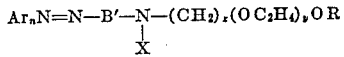

in which $Ar_n$ is a radical included in the group consisting of aromatic radicals in the benzene and naphthalene series containing at least one nitro group, B' is a radical of the benzene series, R is alkyl, $x$ and $y$ are small whole numbers and X is a member of the group consisting of hydrogen, alkyl, aralkyl, hydroxyalkyl, alkoxyalkyl and polyalkoxyalkyl radicals.

6. Azo dyes having the following formula:

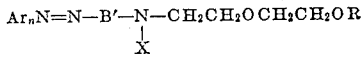

in which $Ar_n$ is a radical included in the group consisting of aromatic radicals in the benzene and naphthalene series containing at least one nitro group, B' is a radical of the benzene series, R is alkyl, $x$ and $y$ are small whole numbers and X is a member of the group consisting of hydrogen, alkyl, aralkyl, hydroxyalkyl, alkoxyalkyl and polyalkoxyalkyl radicals.

7. Azo dyes having the following formula:

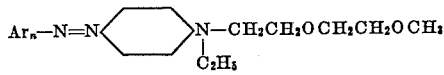

in which $Ar_n$ is a radical included in the group consisting of aromatic radicals in the benzene and naphthalene series containing at least one nitro group.

8. An azo dye having the following formula:

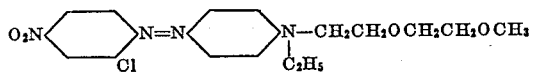

said dye being capable of dyeing vinylhalide-vinylacetate copolymers and cellulose esters a bluish red shade.

9. An azo dye having the following formula:

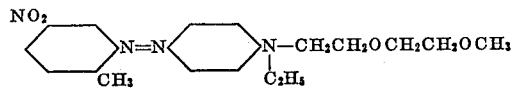

said dye being capable of dyeing vinylhalide-vinylacetate copolymers and cellulose esters a golden yellow.

10. An azo dye having the following formula:

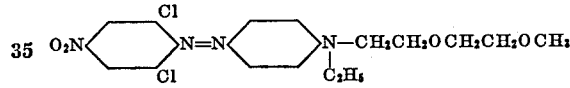

said dye being capable of dyeing vinylhalide-vinylacetate copolymers and cellulose esters a rust brown.

11. A vinylhalide-vinylacetate copolymer material dyed with a dye according to claim 1.

12. A vinylhalide-vinylacetate copolymer material dyed with a dye according to claim 2.

13. A cellulose ester material dyed with a dye according to claim 1.

14. A cellulose ester material dyed with a dye according to claim 2.

FREDERIC HENRY ADAMS.

CERTIFICATE OF CORRECTION.

Patent No. 2,266,142. December 16, 1941.

FREDERIC HENRY ADAMS.

It is hereby certified that error appears in the printed specification of the above numbered patent requiring correction as follows: Page 1, second column, line 51, in the formula, for "$C_2H_6$" read --$C_2H_5$--; page 2, first column, line 58, for "will" read --which--; page 5, first column, line 3, claim 1, in the formula, for "$(OC_2H)_yOR_4$" read --$(OC_2H_4)_yOR$--; and that the said Letters Patent should be read with this correction therein that the same may conform to the record of the case in the Patent Office.

Signed and sealed this 3rd day of February, A. D. 1942.

(Seal)

Henry Van Arsdale,
Acting Commissioner of Patents.